Sept. 7, 1965     A. L. WHEAR     3,204,872

MOISTURE RESPONSIVE ACTUATOR

Filed June 12, 1961     2 Sheets-Sheet 1

ALFRED L. WHEAR
INVENTOR.

BY Paul A. Weilein
ATTORNEY.

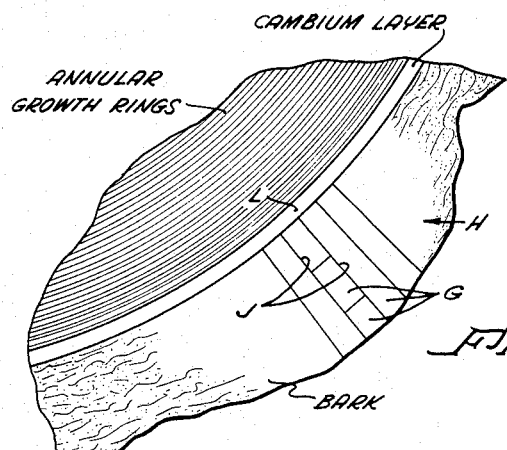
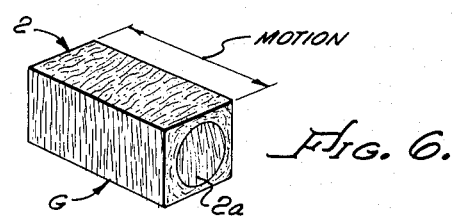
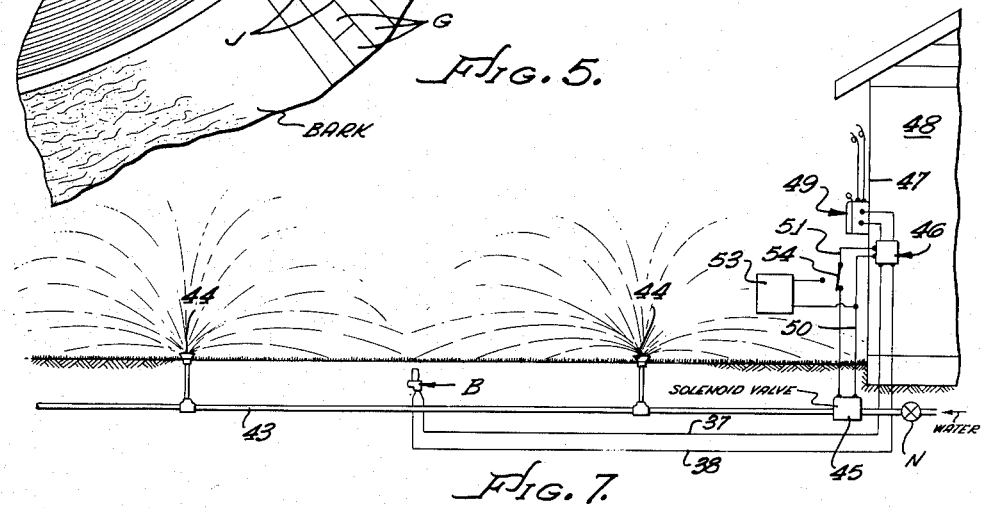
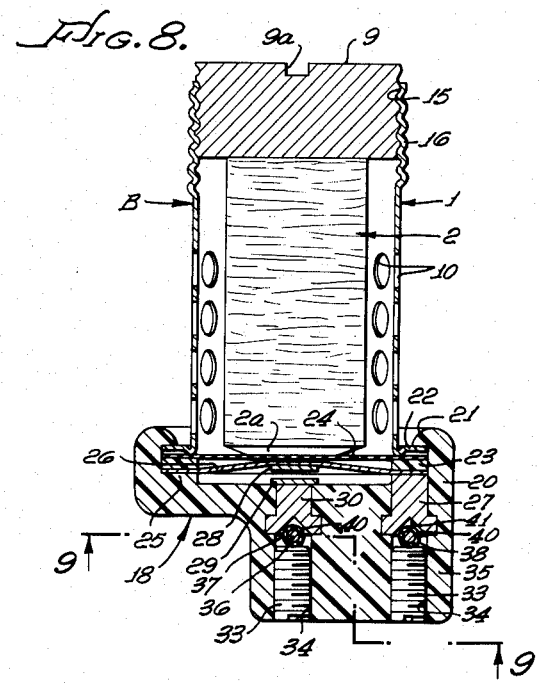
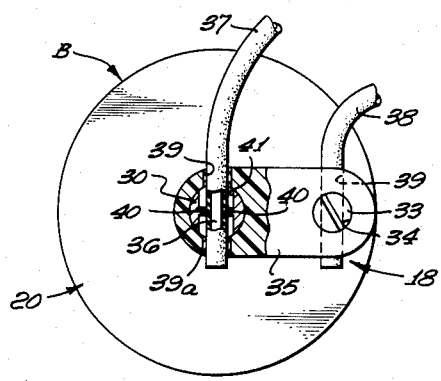
ALFRED L. WHEAR
INVENTOR.
BY Paul A. Weilein
ATTORNEY.

United States Patent Office 3,204,872
Patented Sept. 7, 1965

3,204,872
MOISTURE RESPONSIVE ACTUATOR
Alfred L. Whear, Hilton Creek, Calif.
(Star Route 3 via Bishop, Calif.)
Filed June 12, 1961, Ser. No. 116,428
8 Claims. (Cl. 239—63)

This invention relates to a novel moisture responsive actuator which may be employed for controlling the operation of an irrigating system or for operating an electrical switch or other control element associated with means or mechanisms wherein control of operation thereof is desired according to ambient moisture conditions.

One of the objects of this invention is to provide a moisture responsive actuator such as described wherein a simple form of housing having the interior thereof exposed to ambient moisture when placed above, or on or in the ground, a novel moisture responsive member in the housing, and a control member movable between predetermined positions according to expansion and contraction movements of the moisture responsive member as effected by the moisture content thereof, are cooperable in a novel manner to control the operation of a system, means or mechanism that is operatively connected to the control member.

It is another object of this invention to provide a moisture responsive actuator such as described which is subject to advantageous use for controlling the operation of an irrigating system for trees or other plants, there being in operative connection with the moisture responsive member of the actuator, a valve element which is maintained open to allow irrigation water to pass through the valve unit when the moisture responsive member is substantially free of moisture and which closes and shuts off flow of irrigation water upon the moisture responsive member becoming moistened and expanding in one direction.

It is another object hereof to provide a moisture responsive valve actuator wherein a simple form of housing having one or more openings to admit moisture, is provided with a valve chamber adapted to be coupled in an irrigation pipe line and to admit flow of water therethrough onto or into the ground, there being a valve member in the form of a diaphragm forming a seal between the housing and the valve chamber and engaged with one end of the moisture responsive member that is operable to expand and contract according to moisture content thereof and thereby exert a force which will cause the diaphragm valve member to open and close.

The invention also contemplates the provision of a novel moisture responsive control unit that is especially adapted for controlling a sub-surface irrigation system in that the unit may be embedded in the ground in direct connection with an embedded valved outlet for irrigation water located in the desired relation to the root areas of one or more trees or plants, and will operate in a reliable manner to maintain the desired irrigation of the selected ground area according to the moisture content of the surrounding soil.

It is another object to provide a moisture responsive control unit which may include a circuit closer for an electrical circuit for electrically responsive means arranged to operate irrigation valves or to operate a signal or indicator according to ambient moisture conditions relative to selected areas of ground, such a control unit being operable as a remote control device which when placed on or in the ground at a selected area will operate to start and stop an irrigation operation at selected areas according to the moisture content of the ground at the area where the remote control unit is operated. If the electrical circuit is employed for operating a signal, the signal will be produced according to moisture content of the ground at the area where the control unit is located and such a signal will constitute an indication of the moisture condition of the ground at a selected location, for example, as a guide for irrigation or other purposes.

It is a further object of this invention to provide a moisture responsive actuator of the character described wherein the housing for the moisture responsive member includes a closure axially adjustable in one end thereof and engaged with the moisture responsive member whereby the action of the valve or other control member actuated by the moisture responsive member may be varied upon adjustment of the closure.

Another object hereof is to provide a moisture responsive actuator such as described which will operate slowly so that sufficient time will lapse following moistening of the moisture responsive member to assure continued water flow and adequate irrigation.

Another object of this invention is the provision in an actuator of the character described of a novel moisture responsive member which is derived from the bark of the redwood tree and has the advantageous quality of exerting considerable force in a given direction when expanding and contracting, according to the moisture content thereof, it being possible to provide with a very small portion of the bark, according to the moisture content thereof, a force sufficient to actuate a valve or to move a control member in association with a mechanism which it is desired to operate to control according to ambient moisture conditions. It has been found that when a piece of the bark of a redwood tree is cut from the bark transversely and outwardly from the cambium layer of the tree, in a direction radially of the cambium layer and so that the cut is made across grain or fibers which extend lengthwise of the tree, the resultant piece of absorptive bark will expand for the most part in a given direction more particularly than otherwise, when moistened, and will contract in the opposite direction upon diminution of the moisture content. Such a redwood bark piece, when employed as here provided, will withstand repeated wetting and drying over long periods of time without losing the quality of exerting a considerable force in one direction when moistened sufficiently to open a valve or to cause an operating or control member to move between predetermined positions.

Accordingly, it is a further and more specific object of the invention to provide an irrigation control device which is actuated by a section of the bark of a redwood tree or other tree bark or material having the ability to expand forcefully and gradually when moistened, and to withstand the deleterious effects of moisture and soil acids, decay, mildew and the like.

Yet another object is to provide a self-contained irrigation valve unit having means for connecting the same to an irrigation line and including soil moisture responsive valve means for controlling the moisture of the soil in the vicinity of the unit. In this connection, a valve body is preferably provided with a nipple having an inlet opening, the nipple having threads adapted to engage in a hole punched or otherwise provided in plastic irrigation conduit or hose.

Other objects and advantages of the invention will be hereinafter described or will become apprent to those skilled in the art, and the novel features of the invention will be defined in the appended claims.

Referring to the drawings:

FIG. 5 is a fragmentary top plan view of a piece of a redwood tree showing some of the growth rings, the cambium layer and the bark, also indicating how pieces of the bark may be cut to provide moisture responsive members in accordance with this invention;

FIG. 6 is a perspective view of one of the moisture responsive actuators as cut from the bark shown in FIG. 5;

FIG. 7 is a schematic view of a modified form of this invention as employed to serve as a remote control for an irrigation system;

FIG. 8 is a vertical sectional view of a modified form of the invention shown in FIG. 7 for operating an electrical switch; and FIG. 9 is a sectional view taken on the line 9—9 of FIG. 8.

Figure 1:
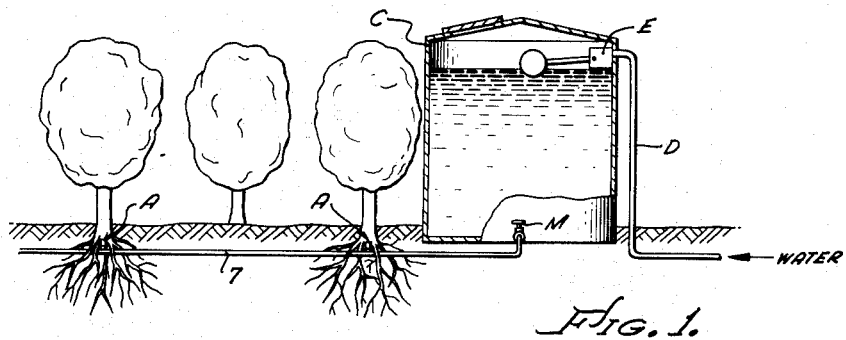
FIG. 1 is a schematic view showing how moisture responsive actuators embodying this invention may be employed to control a subsurface irrigating system for trees and other plants.

As shown in the accompanying drawings, a moisture responsive actuator A embodying this invention generally includes a housing 1 constructed to admit ambient moisture to the interior thereof, a moisture responsive member 2 mounted in the housing to expand and contract according to the moisture content thereof, and a movable operating or control member which is operatively connected or engaged with the moister responsive member 2 for movement between control positions.

As shown in FIGS. 1–4, the movable control element 3 is in the form of a resilient diaphragm type valve V that is normally open and free from contact with a seat 4 in a cup-like valve body 5, here shown as joined to the housing 1. The valve body 5 is provided with a nipple 6 adapted to be coupled to an irrigation supply pipe 7. This nipple has a flow passage 7a leading through the seat 4 and into a chamber 5a of the valve body 5, thence to outlet openings 8 in the body 5 so that water will flow through the outlets 8 when the valve V is unseated.

Figure 2:
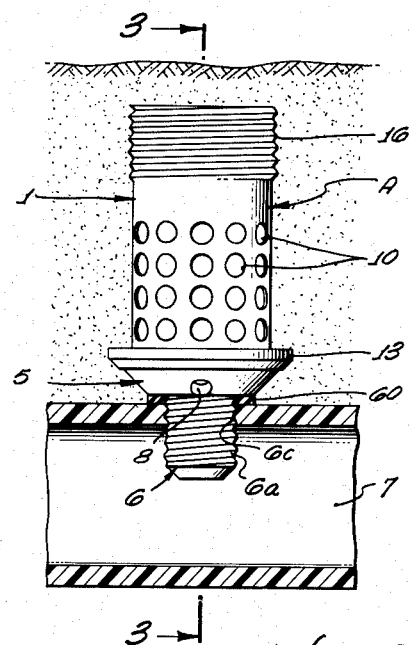
FIG. 2 is a side elevational view of a moisture responsive actuator embodying this invention as coupled to a subsurface irrigation pipe to control the discharge of water therefrom.
Figure 3:
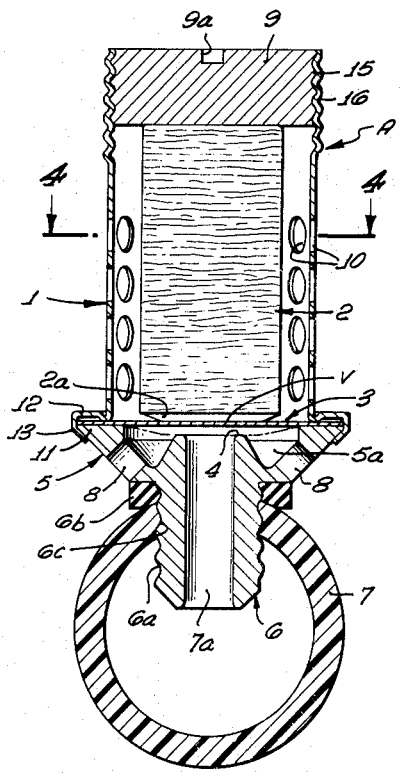
FIG. 3 is an enlarged vertical sectional view taken on the line 3—3 of FIG. 2.

As shown in FIGS. 2 and 3, the housing 1 is elongate and cylindrical, being preferably formed of non-corrosive material and closed at opposite ends by means of a plug 9 and the movable control member 3 which forms the diaphragm valve V. Between its ends the housing 1 is provided with a plurality of openings 10 to expose the moisture responsive member 2 to ambient moisture. Hence, housing 10 constitutes an open support for the member 2.

The valve body 5, as shown in FIG. 3, is provided with an annular flange 11 which abuts a similar flange 12 on the lower end of the housing 1. A portion of the flange 12 is crimped as at 13 around the flange 11 to secure the valve body 5 to the housing 1 with the marginal portion of the diaphragm valve V clamped between the flanges 11 and 12. With this arrangement, the diaphragm valve V forms a fluid tight seal between the housing 1 and the valve chamber 5a.

With reference to FIG. 3, it will be seen that the moisture responsive member 2 is confined in the housing 1 so as to expand and contract between the plug 9 and the valve member V, with an end 2a abutting the valve member. The end 2a, as here shown, is preferably somewhat rounded to assure effective movement of the valve member V in response to expansion and contraction of the moisture responsive member 2.

In accordance with this invention, the moisture responsive member 2 is of such a nature and so arranged that the major amount of expansion and contraction will be in a direction substantially perpendicular to the member 3 forming the diaphragm valve V. Accordingly, upon contraction of the moisture responsive member 2, the resilient diaphragm valve V will be in the normal unseated position shown in FIG. 3, to permit water to flow through the openings 8 in the valve body 5. However, when the moisture responsive member 2 becomes moistened and expands, the valve V will be moved toward its seat at a rate dependent upon the expansion rate of the member 2, until the valve is fully closed.

The plug 9 closing one end of the housing 1 is provided with screw threads 15 engaged with screw threads 16 in the housing 1, the upper end of the plug having a tool-receiving slot 9a therein whereby the plug may be axially adjusted. When the plug is screwed inwardly, the rigid moisture responsive member 2 will be moved correspondingly and cause the valve member V to bow toward the seat 4. According to the adjustment of the plug 9, the action of the moisture responsive member may be controlled as to the time required to seat and unseat the valve.

Figure 4:
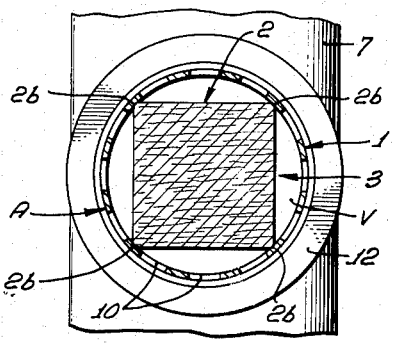
FIG. 4 is a cross sectional view taken on the plane of line 4—4 of FIG. 3.

The moisture responsive member 2, as here shown, is preferably elongate and of square cross section. With such a form, the member 2 does not obstruct entrance of moisture into the housing 1 through the openings 10, and in addition, the dimension of the member 2 diagonally across corners is preferably such that, as shown in FIG. 4, the corners 2b of the member 2 will abut the circular wall of the housing 1 to centralize and stabilize the member 2 within the housing. However, it should be noted that the housing 1 and member 2 may be of shapes other than here shown, provided the member 2 is properly positioned in the housing and will expand and contract axially according to the moisture content thereof so as to exert a force for moving the control member 3 or valve V in the manner here shown.

It is to be understood that any moisture absorptive member which will expand and contract for the most part in a direction toward and away from the diaphragm valve V responsive to moisture content, may be used in accordance with this invention. However, according to one of the more specific aspects of the invention, a suitable moisture responsive member may be obtained by using the bark of trees such as redwood, juniper, cedar and cypress trees. It is preferred, however, to employ the bark of a redwood tree cut in a particular manner, as shown in FIG. 5, so that the greater extent of expansion and contraction thereof according to its moisture content will be in a predetermined direction. As shown in FIG. 5, small pieces G of bark H which are cut as at J transversely of the grain or fibers in the bark and radially outwardly from the cambium layer L of a piece of a redwood tree, has been found to provide a moisture responsive member which has a number of advantages when employed in accordance with this invention. A piece of the bark cut as above noted and constituting an actuating moisture responsive member 2 employed as here shown, will repeatedly, over long periods of use, exert a force directly upon a valve or control member to cause movement thereof between different predetermined positions. FIG. 6 shows a typical moisture responsive member embodying the present invention and, as indicated by the arrow, the direction in which the member has the greater movement upon expansion and contraction is axially of the member 2, this direction being radial in relation to the bark H on the tree from which the member 2 originated, i.e., the member 2 consists of a radial segment of the bark having an elongated form, with the grain or fiber of the bark extending transversely of the segment.

FIG. 1 shows a typical use of actuators A embodying this invention wherein such actuators are connected to a low pressure subsurface irrigation supply line 7 so as to be disposed adjacent and above the root area of trees or other plants. This supply line 7 is connected to a suitable supply which may comprise a tank C arranged at ground level to provide a low pressure head. A water supply line D leads to the tank C and the level of the water in the tank is controlled by a float valve unit E. The actuators A are disposed below the surface of the ground or may be located with the upper end at ground level, it being the object to irrigate the root area of trees and plants in such a manner that the moisture responsive element 2 in the actuator will become dry prior to the time that the entire root area dries out. Preferably, the actuators A, in this illustrative application, are located beneath the ground surface so as to effect subsurface irrigation while supplying a minimum of water to shallow rooted weeds and the like and so as to reduce evaporation of irrigation water. The actuators A employed in accordance with this invention should be positioned above substantially all of the root area level. However, it should be noted that different types of irrigation may be required for different plants in which case the actuator A may be positioned as desired so that according to ambient moisture conditions it will open and close an irrigating valve as desired.

Since the valves V in the actuators A as employed in the system shown in FIG. 1 are normally open, the supply line 7 is provided with a readily accessible manually operable valve M which is opened when it is desired to put the irrigation system in operation and subject to control by the actuators A.

The redwood bark moisture responsive member 2 provided in accordance with this invention will react slowly to moisture, it having been found in actual use of such an element that between one-half and one hour of time may be required to cause a moisture response of the member sufficient to completely close the valve. This time factor may be varied by adjusting the plug 9 to change the position of the flexible diaphragm valve V as hereinbefore noted. In fact, the valve V may be seated mechanically and likewise unseated upon appropriate adjustment of the plug 9.

Installation of an actuator A in the supply line 7 may be facilitated in accordance with another feature of the invention by providing the nipple 6 with self-tapping screw threads 6a and a sealing gasket 6b. In the use of this arrangement the supply line 7 would be made of plastic material and punched or otherwise provided with a hole or opening 6c into which the nipple may be easily threaded without requiring special fittings, couplings or tools.

The modified form of this invention shown in FIG. 8 and designated B, is of the same construction as the actuator A shown in FIGS. 1–4 except that instead of having a valve unit attached thereto, it is arranged to operate an electrical switch unit 18. One of the uses of this modified form of actuator is shown in FIG. 7 and will be hereinafter fully described. In this modified form all of the elements except the diaphragm and the switch unit 18 are identified by the same reference characters as applied in FIGS. 1–4. The switch unit 18 includes a switch body 20 which preferably is made of a suitable plastic material and sealed against entrance of moisture. As here shown, the body 20 is joined to the housing 1 by a part 21 of the body 20 which fits over the flange 22 on the housing, there being a fiber washer 23 between a non-conductive diaphragm 24 and a shoulder 25 provided in the body 20, thereby forming a leak-proof seal between the body 20 and the housing 2.

Any suitable switch arrangement may be employed that will respond to movement of the diaphragm 24 which corresponds to the diaphragm valve V but is made of non-conductive material or may be insulated by a rubber or similar coating. However, as shown in FIG. 8, a bowed snap action resilient member 26 of conductive material is clamped between the fiber washer 23 and the body 20 so as to abut the diaphragm 24. One end of the resilient member 26 engages the shoulder 25 while the other end abuts a binding post 27 which may be molded in the plastic chamber 20. Intermediate its ends, the resilient snap action member 26 is provided with a contact member 28 for engaging a stationary contact 29 suitably electrically connected with a binding post 30 which may also be molded in the plastic chamber 20.

As shown in FIGS. 8 and 9, the binding posts 27 and 30 include set screws 33 threaded into openings 34 formed in a reduced extension 35 of the switch body 20. When the actuator B is connected in an electrical circuit, terminals 36 of insulated conductors 37 and 38 of the circuit are inserted through openings 39 extending transversely through the extension 35 so as to intersect the set screw openings 34 and are preferably lined with resilient moisture seals 39a engageable with the insulator sheath on the conductors 37 and 38. This insertion of the conductors disposes them between the inner ends of the set screws 33 and knife edge contact portions 40 formed in depressions 41 in the binding posts 27 and 30. Upon screwing down on the set screws 33, the knife edge contact portion 40 will cut through the insulation on the conductors and make proper contact with the wires. As shown in FIG. 9, the knife edge contact portions 40 are constructed and arranged so as to make the desired contact without severing the wires.

The molded binding posts 27 and 30, together with the above described means of making contact with the conductors, provide seals preventing moisture from getting into the switch body 20 and to the point of contact of the contact portions 40 with the conductors. FIG. 9 shows how the insulation of the conductors seals in the openings 39.

Referring now to FIG. 8, it will be apparent that upon expansion and contraction of the moisture responsive member 2 according to the moisture content of the latter, the diaphragm 24 and the resilient normally upwardly bowed member 26 will respond and cause the contacts 28 and 29 to become engaged and disengaged for controlling an electrical circuit.

One of the uses of the modified form of actuator B shown in FIGS. 8 and 9 is exemplified in FIG. 7, wherein the actuator B serves as a remote control device for an irrigation or sprinkler system including a subsurface water supply pipe 43 having in this instance sprinkler heads or outlets 44 connected thereto and disposed above the ground. In this use of the actuator B it may be placed in the ground in a selected area, for example as shown in FIG. 7, where it is desired to control the irrigation through actuation of a solenoid operated valve 45 in the supply line 43.

An electrical circuit including the conductors 37 and 38 lead from the switch in the actuator B to a relay and transformer unit 46 mounted remote from the actuator, for example, upon the wall 47 of a building 48, thence through a manually operable switch 49 and to a source of electrical energy, not shown. Conductors 50 and 51 lead from the relay transformer unit 46 to the solenoid actuated valve 45 in the supply line 43, this valve being normally open.

A manually operable valve N is provided in the supply line 43 between the source of supply of water and the solenoid valve 45 whereby when it is desired to put the system in operation to commence irrigation, the valve N may be opened. After the valve N is opened and the ground around the actuator B becomes moistened, the moisture responsive member 2 in the actuator also becomes moistened and in time, as the moisture content thereof increases, it will expand and close the switch unit, thereby closing the circuit for the normally open solenoid valve and effecting the closure of this valve to shut off flow of water into the irrigation system.

It should be noted that the actuator B may also be used for operating a signal or indicator according to ambient moisture conditions in the area where the actuator B is located. This is exemplefied in FIG. 7 wherein any suitable indicating or signal unit 53 may be connected with the conducors 50 and 51 through a selective circuit closer 54. This circuit closer when in one position will connect the solenoid valve 45 in the circuit and when in the other position will connect the signal unit 53 in the circuit controlled by the actuator B. With this arrangement the irrigation system shown in FIG. 7 may be manually controlled through the valve N, this valve being opened to start watering or irrigating with the system and is subject to being manually closed when the signalling or indicating device is actuated. Actuation of the signalling or indicating unit 53 will take place when the ground surrounding the actuator B becomes irrigated to the extent that the moisture responsive member 2 in the actuator expands and closes the switch unit in the switch chamber 20, thereby closing the circuit for the signal 53.

While the specific details of the various features of the invention have been herein shown and described in two embodiments, it will be understood that changes and alternations may be resorted to without departing from the spirit of the invention as defined in the appended claims.

I claim:

1. A moisture responsive actuator comprising: an elongate housing having an opening therein to admit ambient moisture; a plug closing one end of the housing; a valve body at the other end of said housing and having a chamber and a valve seat therein; means carried by said valve body affording communication with a fluid supply line; said body having an outlet and means therein providing a flow passage for conveying fluid from said supply line through said seat and to said outlet; a resilient diaphragm valve member; means securing said diaphragm valve member between said chamber and said housing to form a fluid tight seal therebetween with said diaphragm valve member normally spaced from said seat and disposed to be moved against said seat; and an absorptive moisture responsive member having opposed extremities engaged with said plug and said diaphragm valve member; said moisture responsive member having the quality of expanding in a direction toward said valve member according to the moisture content thereof to move said valve member against said seat to arrest the flow through said passage.

2. A moisture responsive actuator comprising: an open support; a resilient diaphragm carried by said support; and absorptive moisture responsive member carried by said support and engaged with said diaphragm operable in response to moisture content thereof to expand in a direction toward said diaphragm to move said diaphragm; a valve body connected to said support and having a flow passage therethrough; and a seat circumscribing said passage and engageable by said diaphragm to close the passage to flow.

3. A moisture responsive actuator comprising: an open support; a resilient diaphragm carried by said support; an absorptive moisture responsive member carried by said support and engaged with said diaphragm operable in response to moisture content thereof to expand in a direction toward said diaphragm to move said diaphragm; a valve body connected to said support; a threaded stem on said body; said stem and said body having a flow passage therethrough; and a valve seat circumscribing said passage and engageable by said diaphragm upon expansion of said member to arrest the flow through said passage.

4. A moisture responsive actuator member expansible and contractible in accordance with its moisture content consisting of a block of tree bark of elongated form cut from a tree with the major axis of the block substantially radial of the tree axis from which the block was cut and with all of the fibers in the block extending substantially transversely of said major axis, said block having at opposite ends bearing faces spaced apart along said major axis.

5. A moisture responsive member as defined in claim 4, wherein said block is rectangular in transverse section.

6. A moisture responsive member as defined in claim 4, wherein said block is bark of a redwood tree.

7. A moisture responsive actuator device comprising: an open support; a body of moisture absorptive expansible material carried by said support; and means on said support engaging opposed portions of said body including an actuator element carried by said support for movement responsive to expansion and contraction of said body; said body consisting of a segment of the bark of a redwood tree; said segment of said bark being elongate with all of the bark fibers extending substantially transversely thereof.

8. An irrigation control valve device comprising: a valve body; means on said body for connection to an irrigation conduit; said body and said means having a flow passage therethrough; and open support in said body; an actuator member of moisture absorptive expansible material carried by said support; and valve means within said body and engaged by said actuator member to close said passage upon expansion of said member; said actuator member comprising a block of tree bark cut from a tree with the major axis of the block substantially radial of the tree axis from which the block was cut and with all of the fibers in the block extending substantially transversely of said major axis, said block having at opposite ends bearing faces spaced apart along said major axis.

References Cited by the Examiner

UNITED STATES PATENTS

| 1,718,389 | 6/29 | Spaulding | 73—337 |
|---|---|---|---|
| 2,041,658 | 5/36 | Hodge | 200—61.06 |
| 2,073,808 | 3/37 | Ross | 200—61.06 |
| 2,137,024 | 11/38 | Moore et al. | 73—337 X |
| 2,503,273 | 4/50 | Johnson | 73—337 |
| 2,688,056 | 8/54 | Kettering | 200—61.06 |
| 2,728,228 | 12/55 | Case | 73—337 |
| 2,812,976 | 11/57 | Hasenkamp | 239—63 |
| 2,895,493 | 7/59 | Edwards | 137—78 |
| 2,965,117 | 12/60 | Gallacher | 137—78 |
| 2,969,185 | 1/61 | Geiger | 239—63 |

ISADOR WEIL, *Primary Examiner.*

JACOB NACKENOFF, *Examiner.*